United States Patent Office 3,041,249

Patented June 26, 1962

1

2

3,041,249

PRODUCTION OF ACTIVE DRY YEAST

Shao Lin Chen and Elmer J. Cooper, Milwaukee, Wis., assignors to Universal Foods Corporation, a corporation of Wisconsin No Drawing. Filed July 28, 1960, Ser. No. 45,792
25 Claims. (Cl. 195—74)

This invention relates to the production of a stabilized active dry yeast and particularly to novel processes for producing the same.

Active dry yeast is a well known commodity of commerce. The commercial product contains about 8% moisture and is conventionally packaged for the consumer trade in aluminum foil packages under a nitrogen atmosphere. Under such conditions the active dry yeast has rather good stability, losing about 1 to 1½% per month of its initial activity when stored at room temperature. Accordingly, the product has a shelf storage life of a year or more. This may be contrasted to ordinary wet press cake yeast containing from about 68 to 72% moisture which must be kept under refrigeration and even under these conditions has a practical storage life of only about one month. While active dry yeast represents a considerable advance over the wet press cake yeast in simplicity of storage and in the extension of storage life in general, it has certain drawbacks, which if eliminated would result in a superior product.

One major problem with respect to active dry yeast has been the requirement that the yeast packages be constructed so as to preclude contact of the active dry yeast with the oxygen in air. This, as indicated above, is accomplished by storage of the yeast in aluminum foil packages under a nitrogen atmosphere. In large commercial bulk handling of active dry yeast contact with the oxygen in the atmosphere is usually prevented by shipment in sealed collapsible rubber drums or containers and again under a nitrogen atmosphere.

In the event of a rupture of the foil container from pinholes or the like, the active dry yeast is exposed to the atmosphere. This results in a greatly accelerated rate of decrease in the viability or activity of the yeast. The activity of active dry yeast exposed to the atmosphere drops at a rate of about 8 to 10% a month and of course constitutes a serious loss of effectiveness in a short time.

Accordingly it is one of the objects of this invention to provide a process for the manufacture of a stabilized active dry yeast which does not require the use of nitrogen or other oxygen-free atmosphere in packaging. This would of course considerably reduce costs and simplify handling of the materials.

Accordingly, in one broad form the present invention includes the provision of a process for producing a stabilized active dry yeast which process comprises forming an aqueous emulsion of a solution of compound selected from the group consisting of butylated hydroxyanisole, butylated hydroxytoluene and propyl gallate, admixing said emulsion with an aqueous suspension of yeast cells, removing excess moisture from the admixture to provide a wet press cake of said yeast cells, extruding said wet press cake in strand-like form, and drying said yeast to a moisture content of less than about six percent under conditions to maintain viability of said yeast product.

In the present process it is preferred that the yeast cells such as *Saccharomyces cerevisiae* utilized as a starting material be in the form of an aqueous suspension or more commonly "cream." Generally this cream has a dry solids content of yeast cells of from about 12 to about 18 weight percent, although this is not critical.

The antioxidants utilized in this process are butylated hydroxyanisole, butylated hydroxytoluene and propyl gallate, and the amount thereof utilized may vary from between about 0.025 to about 0.5 weight percent, based upon the dry yeast solids treated. A preferred range of antioxidant is between about 0.025 and about 0.3 weight percent, on the same basis.

It is necessary that the antioxidant be incorporated with the yeast cells in emulsion form, and to carry this out it has been found desirable, in one specific embodiment, to utilize a nontoxic, edible vehicle in which the particular antioxidant is soluble. Exemplary of such vehicles are edible fats and oils, such as peanut oil, soybean oil, corn oil, lard and other naturally occurring fats and oils and vehicles, such as propylene glycol. Solid and liquid fats are both contemplated. The amount of the vehicle may vary, although for the purposes of this invention from about 0.5 to about 2.5 weight percent on a dry solids yeast basis is satisfactory, and a preferred range is from about one to about two percent. Usually the amount of vehicle required will be dependent upon the particular antioxidant chosen and the solubility of the antioxidant in that vehicle. Accordingly where a vehicle is utilized in which the antioxidant is highly soluble, less vehicle will be required than in the case where a vehicle with poorer solvent properties is used. Generally the emulsion may be prepared by conventional homogenization techniques and the use of laboratory or commercial equipment. Preferably the sequence of steps in the preparation of the emulsion in one specific embodiment involves dissolving of the antioxidant in the vehicle to be utilized which may be carried out by heating at elevated temperatures if desired or necessary in the case of solid fats. The solution of vehicle and antioxidant may then be homogenized to form an emulsion by the use of the standard equipment referred to above. Preferably the water used in the preparation of the vehicle emulsion should be at a temperature of from about 30° to 70° C. and should be relatively free from hardness. In forming this emulsion the oil or vehicle containing the antioxidant is added with stirring to the water at temperatures from about room temperature to about 30° to 70° C. By this procedure the emulsion formed has the vehicle-antioxidant solution as the disperse phase and the water as the continuous phase.

It has also been found that certain nontoxic, nonionic surfactants or emulsifiers in conjunction with the antioxidant produce an emulsion of good stability and handling characteristics. Accordingly it is a further aspect of this invention to utilize such nontoxic, nonionic surfactant in the production of antioxidant emulsions. Exemplary of such surfactants are sorbitan monolaurate, sorbitan monopalmitate, sorbitan mono-oleate, sorbitan trioleate, sorbitan monostearate, and mono- and diglycerides. The nonionic surfactants are usually added to the water at temperatures of from 60 to 80° C. and preferably from 65 to 75° C. prior to the incorporation therein of the antioxidant at substantially the same temperatures. The amount of such surfactant is not critical, sufficient being used to produce a stable emulsion. Generally from about 0.2 to about 5 weight percent (on a dry solids yeast basis) is satisfactory.

A still further embodiment of the invention is the utilization of vehicle, and nontoxic, nonionic surfactant in the preparation of antioxidant emulsions, which may be then incorporated with the yeast cream to produce an active dry yeast of superior properties. In this procedure the antioxidant is incorporated into the vehicle as described above and then combined with water containing the surfactant to produce a stable emulsion.

The mixing of the emulsions referred to above, and the yeast suspension may be carried out in conventional equipment or stirrers. The temperature conditions may range from normal room temperature to about 60 C. The admixture thus formed is further treated by techniques which are conventional in the production of active dry yeast. Accordingly the suspension of yeast cells and admixed emulsion of antioxidant are concentrated by the removal of excess moisture by means of a filter press to produce a wet pressed cake of yeast cells having a moisture content of from about 68 to about 72 weight percent. The moisture should be reduced to the point where the yeast, after extrusion, retains its structural integrity before entering the drying stage. The wet pressed cake is then extruded in conventional extrusion apparatus to form strands of predetermined diameter to produce a "noodle" form prior to introduction into a drying zone. While the precise form of noodle or strand is not critical, it should be understood that this mode of procedure has as its purpose the reduction of bulk in the wet pressed cake to aid in the drying operation. The drying may be carried out by the conventional techniques employed with active dry yeast manufacture utilizing controlled temperatures and humidity in such a manner that the viability of the yeast is maintained at a maximum. The drying operation may be carried out at air temperatures of from about 30° to about 60° C., at relative humidities of about 10 to about 70 percent. The drying time will vary from between about 3 to about 6 hours. The final moisture content of the yeast should be from about three to about six percent and preferably from about four to about six percent. This low moisture content is to be contrasted with the commercial moisture content of about eight percent. The product may be packaged in double or triple layer polyethylene containers to exclude moisture present in the atmosphere. It is not necessary to package this yeast under nitrogen gas in the conventional foil or other type containers.

While the use of antioxidants in the preparation of various unsaturated fats and oils has been well known, the effect of these compounds in maintaining the activity of active dry yeast has not been heretofore known. It should be understood that the storage stability of active dry yeast and its activity are directly associated with the viability of the yeast cells. Viability is of course related to the capacity of the dehydrated yeast cells in the active dry yeast to be rehydrated and carry out the metabolism of sugar to carbon dioxide and alcohol which is the conventional metabolism in baking processes. It is unexpected and surprising that the compounds herein referred to should enhance the stability of the yeast cells when in contact with the atmosphere. Accordingly the product produced by the present process need not be stored under a nitrogen atmosphere to maintain stability equal or superior to the present commercial product under nitrogen.

For a more complete understanding of the present invention, reference will be made to the following examples:

EXAMPLE 1

*Effect of Antioxidant-Vehicle Emulsion on Stability of Active Dry Yeast*

An amount of about 1.28 grams of antioxidants (butylated hydroxyanisole, butylated hydroxytoluene or propyl gallate) is dissolved in 5 milliliters of vehicle (peanut oil or propylene glycol). The antioxidant-vehicle solution is emulsified with a commercial homogenizer, utilizing distilled water. The emulsion thus formed is mixed with four liters of yeast cream containing 640 grams of yeast solids. The final concentration of the antioxidant in the mixture is therefore 0.2% on a yeast solids basis. For the control, only the vehicle (peanut oil) with no antioxidant added is used. The protective effect of the antioxidant-vehicle emulsions on the stability of active dry yeast, as compared with the control treated with vehicle emulsion alone and the regular active dry yeast samples, is shown in Table 1.

TABLE 1.—PROTECTIVE EFFECT OF ANTIO_IDANT-VEHICLE EMULSION ON STABILITY OF ACTIVE DRY YEST

| Treatment | Percent $H_2O$ in ADY[1] | Bake Activity at Following Weeks, 100° F. | | | |
|---|---|---|---|---|---|
| | | 0 | 3 | 5 | |
| 1. Regular active dry yeast #A | 8.10 | 100 | 88 | 75 | 72 |
| 2. Regular active dry yeast #B | 8.10 | 100 | 82 | 68 | |
| 3. Control (vehicle emulsion alone) | 5.52 | 100 | 88 | 74 | |
| 4. BHA-vehicle emulsion | 5.86 | 100 | 89 | 82 | 80 |
| 5. BHT-vehicle emulsion | 5.59 | 100 | 88 | 81 | |
| 6. PG-vehicle emulsion | 5.05 | 100 | 83 | 77 | |

[1] Active dry yeast.
BHA—butylated hydroxyanisole.
BHT—butylated hydroxytoluene.
PG—propyl gallate.
Vehicle for/treatment 3 to 5—peanut oil.
Vehicle for treatment 6—propylene glycol.

The protective effect of antioxidant-vehicle emulsion on the stability of active dry yeast is apparent from the results shown in this table. Without antioxidant added, the regular active dry yeast (Treatment #1 and #2) and the control (Treatment #3) retained only 72 to 74% of their original bake activity after an exposure period of 5 weeks at 100° F. under air atmosphere. On the other hand, an average of 80% of the bake activity is retained under the identical exposure conditions in those samples containing antioxidants (Treatment #4, #5 and #6).

EXAMPLE 2

*Effect of Antioxidant-Vehicle-Surfactant Emulsion on Stability of Active Dry Yeast*

An amount of 12.8 grams of surfactant (Span 60) is dissolved in 160 milliliters of distilled water at a temperature of from 60 to 70° C. To the emulsion is gradually added five milliliters of vehicle (peanut oil or propylene glycol) containing 1.28 grams of antioxidant, prepared in the same manner as described in Example 1. When completely mixed, the mixture is diluted with 160 milliliters of water at the same temperature. The diluted emulsion is then mixed at room temperature with four liters of yeast cream containing about 640 grams of yeast solids.The final concentration of surfactant in the mixture is therefore 2% on a yeast solids basis, and that of the antioxidant is 0.2% on the same basis. The protective effect of the antioxidant-vehicle-surfactant (Span 60) emulsions on the stability of active dry yeast as compared against the control with vehicle surfactant (Span 60) alone is shown in Table 2.

TABLE 2.—PROTECTIVE EFFECT OF ANTIOXIDANT-VEHICLE-SURFACTANT EMULSION ON STABILITY OF ACTIVE DRY YEAST

| Treatment | Percent $H_2O$ in ADY[1] | Bake Activity at Following Weeks, 100 F. | | | |
|---|---|---|---|---|---|
| | | 0 | 3 | 5 | |
| 7. Control (Vehicle-Span 60 emulsion alone) | 4.57 | 100 | 86 | 79 | |
| 8. BHA-Vehicle Span 60 Emulsion | 4.77 | 100 | 95 | 94 | 90 |
| 9. BHT-Vehicle-Span 60 Emulsion | 4.64 | 100 | 88 | 84 | |
| 10. PG-Vehicle-Span 60 Emulsion | 4.81 | 100 | 94 | 92 | |

[1] Active dry yeast.
BHA—butylated hydroxyanisole.
BHT—butylated hydroxytoluene.
PG—propyl gallate.
Vehicle for treatment #7 to #9—peanut oil.
Vehicle for treatment #10—propylene glycol.
Span 60—sorbitan monostearate (Atlas Powder Co.).

The results presented in this table show definite protective effect of antioxidants on the stability of active dry yeast. An average of 90% of the bake activity is retained, after an exposure period of 5 weeks at 100° F., under air atmosphere, in samples treated with antioxidant-vehicle-surfactant (Span 60) emulsions (Treatment #8, #9 and #10); while on the other hand, only 79% of the bake activity is retained under identical exposure conditions in the control (Treatment #7), which is treated with vehicle-Span 60 emulsion alone.

EXAMPLE 3

*Effect of Antioxidant-Vehicle-Surfactant Emulsion on Stability of Active Dry Yeast*

The antioxidant-vehicle-surfactant (Aldo 33) emulsions are prepared in the same manner as described under Example 2, except that Aldo 33 is used to replace Span 60. The protective effect of the antioxidant-vehicle-surfactant (Aldo 33) emulsions on the stability of active dry yeast as compared with the controls treated with vehicle-surfactant (Aldo 33) alone is shown in Table 3.

TABLE 3.—PROTECTIVE EFFECT OF ANTIOXIDANT-VEHICLE-SURFACTANT EMULSION ON STABILITY OF ACTIVE DRY YEAST

| Treatment | Percent $H_2O$ in ADY[1] | Bake Activity at Following Weeks, 100° F. | | | |
|---|---|---|---|---|---|
| | | 0 | 3 | 5 | |
| 11. Control (Vehicle-Aldo 33 Emulsion alone) | 4.38 | 100 | 79 | 62 | 65 |
| 12. Control (Vehicle-Aldo 33 Emulsion alone) | 4.51 | 100 | 81 | 67 | |
| 13. BHA-Vehicle-Aldo 33 Emulsion | 4.32 | 100 | 87 | 84 | 80 |
| 14. BHT-Vehicle-Aldo 33 Emulsion | 4.48 | 100 | 88 | 83 | |
| 15. PG-Vehicle-Aldo 33 Emulsion | 4.53 | 100 | 85 | 74 | |

[1] Active dry yeast.
BHA—butylated hydroxyanisole.
BHT—butylated hydroxytoluene.
PG—propyl gallate.
Vehicle for treatment #11, #13 and #14—peanut oil.
Vehicle for treatment #12 and #15—propylene glycol.
Aldo 33—glyceryl monostearate (Glyco Co.).

The results presented in this table also show definite protective effect of antioxidants on the stability of active dry yeast. An average of 80% of the bake activity is retained, after an exposure period of 5 weeks at 100° F., under air atmosphere, in samples treated with antioxidant-vehicle-Aldo 33 emulsions (Treatment #13 to #15); while on the other hand, only an average of 65% of the bake activity is retained under identical exposure conditions in the controls (Treatment #11 and #12), which are treated with vehicle-Aldo 33 emulsions alone.

EXAMPLE 4

*Effect of Antioxidant-Surfactant Emulsion on Stability of Active Dry Yeast*

An amount of 16.0 grams of surfactant is dissolved in 400 milliliters of distilled water or 0.01 N sodium carbonate solution at a temperature from 65 to 70° C. To the surfactant emulsion is gradually added 3.20 grams of powdered butylated hydroxyanisole upon continued stirring. The temperature is held at 65 to 70° C. for at least five minutes before cooling down to room temperature by slowly adding 400 milliliters of distilled water or 0.01 N sodium carbonate solution. The diluted antioxidant-surfactant emulsion is then mixed at the room temperature with 10 liters of yeast cream, containing about 1,600 grams of yeast solids. The final concentration of the surfactant in the mixture is, therefore, 1% on a yeast solids basis, and that of the antioxidant, 0.2% on the same basis. The protective effect of the antioxidant-surfactant emulsions on the stability of active dry yeast is shown in Table 4.

TABLE 4.—PROTECTIVE EFFECT OF ANTIOXIDANT-SURFACTANT EMULSION ON STABILITY OF ACTIVE DRY YEAST

| Treatment | Percent $H_2O$ in ADY[1] | Bake activity at following weeks, 100° F. | |
|---|---|---|---|
| | | 0 | 3 |
| 16. Control (Aldo 28 emulsion alone) | 5.04 | 100 | 77 |
| 17. BHA-Aldo 28 emulsion | 5.24 | 100 | 92 |
| 18. BHA-Span 60 emulsion | 4.76 | 100 | 91 |

[1] Active dry yeast.
Aldo 28—glyceryl monostearate by Glyco Co.
Span 60—sorbitan monostearate (Atlas Powder Company).
BHA—butylated hydroxyanisole.

The stability test utilized in the foregoing tables was carried out in the following manner:

About 6 grams of active dry yeast sample is stored in a glass serum bottle (volume—25 milliliters) and capped with a sleeve-type rubber stopper. The whole bottle is then immersed in a water bath maintained at 100° F. for 3 to 5 weeks as specified. At the end of the exposure period, the sample is removed for bake activity evaluation.

The procedure for determining bake activity utilized in the examples of this application consists of dissolving 2.7 grams of active dry yeast in 15 milliliters of 3% sugar solution. After standing for 15 minutes, the yeast suspension is mixed with 400 grams of flour and other ingredients, such as salt, sugar, shortening and water. The well mixed and developed dough is then scaled to 16 ounces and placed in a glass cylindrical jar during panary fermentation. When the fermenting dough reaches 1000-milliliter level in the jar, it is punched until most of the gas is removed. The dough is then returned to the jar and permitted to rise again to the same height, and again punched. When the dough rises to the same level for the third time, it is molded into a loaf and placed in a baking pan. The loaf is permitted to rise in a proof cabinet maintained at 95–96° F. and at 90% relative humidity to a predetermined height of 3⅝ inches. It is then removed and baked in an oven at 425° F. The total time required during the entire operation is recorded, from which the bake activities of the active yeast sample is calculated.

From the foregoing it may be seen that the process of the present invention is useful to produce a product of enhanced storage stability without the necessity of packaging under a nitrogen atmosphere or taking other precautions to exclude contact of the active dry yeast with atmoshperic oxygen.

While several types of vehicle, antioxidant and nonionic surfactant were utilized in the foregoing examples, it is to be understood that the principles set forth may be readily extended to a variety of other materials as described in the foregoing specification with essentially the same results.

We claim:

1. A process for producing a stabilized active dry yeast which comprises admixing an aqueous suspension of yeast cells with an aqueous emulsion of a compound selected from the group consisting of butylated hydroxy anisole, butylated hydroxy toluene and propyl gallate, removing excess moisture from said admixture to provide a wet press cake of yeast cells, extruding said wet cake in noodle form and drying the yeast to a moisture content of up to about 6% under conditions to maintain the viability of said yeast.

2. The product of the process of claim 1.

3. The process of claim 1 wherein the yeast solids in said aqueous yeast suspension are from 12 to 18 percent.

4. The process of claim 1 wherein said compound is present in an amount of from 0.025 to 0.5% on a dry yeast solids basis.

5. The process of claim 1 wherein said compound is present in an amount of from 0.05 to 0.3% on a dry yeast solids basis.

6. The process of claim 1 wherein the final moisture content of the active dry yeast is from 3.0 to about 6.0%.

7. A process for producing a stabilized active dry yeast which comprises admixing an aqueous suspension of yeast cells with an aqueous emulsion of a nontoxic, nonionic surfactant and a compound selected from the group consisting of butylated hydroxy anisole, butylated hydroxy toluene and propyl gallate, removing excess moisture from said admixture to provide a wet press cake of yeast cells, extruding said wet cake in noodle form and drying the yeast to a moisture content of up to about 6% under conditions to maintain the viability of said yeast.

8. The product of the process of claim 7.

9. The process of claim 7 wherein the nonionic surfactant is selected from the group consisting of sorbitan mono-oleate, glyceryl monostearate, sorbitan monolaurate, sorbitan monopalmitate, sorbitan monostearate and sorbitan trioleate.

10. The process of claim 7 wherein the yeast solids in said aqueous yeast suspension are from 12 to 18 percent.

11. The process of claim 7 wherein said compound is present in an amount of from 0.025 to 0.5% on a dry yeast solids basis.

12. The process of claim 7 wherein said compound is present in an amount of from 0.05 to 0.3% on a dry yeast solids basis.

13. The process of claim 7 wherein the final moisture content of the active dry yeast is from 3.0 to about 6.0%.

14. The process of claim 7 wherein the nonionic surfactant is present in an amount of from 0.2 to 5% on a dry yeast solids basis.

15. A process for producing a stabilized active dry yeast which comprises admixing an aqueous suspension of yeast cells with an aqueous emulsion of a solution of a compound selected from the group consisting of butylated hydroxyanisole, butylated hydroxytoluene, and propyl gallate in a nontoxic vehicle, removing excess moisture from said admixture to provide a wet press cake of yeast cells, extruding said wet cake into noodle form and drying the yeast to a moisture content of up to about 6% under conditions to maintain the viability of said yeast product.

16. The product of the process of claim 15.

17. The process of claim 15 wherein the emulsion is prepared with a nontoxic, nonionic surfactant.

18. The product of the process of claim 15.

19. The process of claim 15 wherein the nonionic surfactant is selected from the group consisting of sorbitan mono-oleate, glyceryl monostearate, sorbitan monolaurate, sorbitan monopalmitate, sorbitan monostearate and sorbitan trioleate.

20. The process of claim 15 wherein the yeast solids in said aqueous yeast suspension are from 12 to 18 percent.

21. The process of claim 15 wherein said compound is present in an amount of from 0.025 to 0.5% on a dry yeast solids basis.

22. The process of claim 15 wherein the vehicle is selected from the group consisting of edible fats, edible oils and propylene glycol.

23. A process for producing a stabilized active dry yeast which comprises admixing an aqueous suspension of yeast cells with an aqueous emulsion of a solution of a compound selected from the group consisting of butylated hydroxyanisole, butylated hydroxytoluene and propyl gallate in a nontoxic vehicle, with a nonionic surfactant, said compound being present in proportions of from about 0.025 to about 0.5 weight percent on a dry yeast solids basis, and said surfactant being present in an amount of from 0.2 to 5.0% on a dry yeast solids basis, removing excess moisture from said admixture to provide a wet press cake of said yeast cells, extruding said wet cake into noodle form and drying said yeast to a moisture content of less than about 6% under conditions to maintain the viability of said yeast product.

24. The process of claim 23 wherein the vehicle is selected from the group consisting of peanut oil, soybean oil, corn oil, lard and propylene glycol.

25. The process of claim 23 wherein the vehicle is present in an amount of from about 0.5 to about 2.5 weight percent on a dry yeast solids basis.

References Cited in the file of this patent

UNITED STATES PATENTS 2,894,842 Mitchell et al. ........... July 14, 1959

OTHER REFERENCES

The Condensed Chemical Dictionary, 5th Edition, Reinhold Publishing Corp., New York, 1956, page 1070.